(12) United States Patent
Cruz et al.

(10) Patent No.: US 10,291,064 B2
(45) Date of Patent: May 14, 2019

(54) DC POWER DISTRIBUTION SYSTEM

(71) Applicants: Carlos J. Cruz, Green Brook, NJ (US);
Dylan Cruz, Green Brook, NJ (US)

(72) Inventors: Carlos J. Cruz, Green Brook, NJ (US);
Dylan Cruz, Green Brook, NJ (US)

(*) Notice: Subject to any disclaimer, the term of this patent is extended or adjusted under 35 U.S.C. 154(b) by 151 days.

(21) Appl. No.: 15/683,294

(22) Filed: Aug. 22, 2017

(65) Prior Publication Data
US 2019/0067985 A1 Feb. 28, 2019

(51) Int. Cl.
*H02J 3/38* (2006.01)
*H02J 7/00* (2006.01)
*H02J 9/06* (2006.01)

(52) U.S. Cl.
CPC .............. *H02J 9/06* (2013.01); *H02J 3/383* (2013.01); *H02J 3/386* (2013.01); *H02J 7/0052* (2013.01); *H02J 9/062* (2013.01)

(58) Field of Classification Search
CPC .......... H02J 3/383; H02J 3/386; H02J 7/0052; H02J 9/062; H02J 9/06
USPC .......................................................... 307/22
See application file for complete search history.

(56) References Cited

U.S. PATENT DOCUMENTS

| | | |
|---|---|---|
| 7,227,278 B2 | 6/2007 | Realmoto et al. |
| 8,148,844 B2 | 4/2012 | Pan |
| 8,853,888 B2 | 10/2014 | Khaligh |
| 2005/0270816 A1 | 12/2005 | Nielsen |
| 2007/0029879 A1 | 2/2007 | Eldredge |
| 2010/0149731 A1 | 6/2010 | Hopper |
| 2012/0032515 A1 | 2/2012 | Ledenev et al. |
| 2015/0256025 A1 | 9/2015 | Brhlik et al. |
| 2015/0333512 A1 | 11/2015 | Saussele et al. |

*Primary Examiner* — Hal Kaplan
(74) *Attorney, Agent, or Firm* — Thomas J. Germinario

(57) ABSTRACT

A DC power system distributes low voltage (12/24 V) power through a central DC panel to multiple DC loads, such as LED lighting, and to multiple dedicated DC outlets, into which computers, televisions and cell phones can be directly plugged without using an AC-to-DC rectifier. The central DC panel is supplied with DC power (24-36 V) from a central bi-directional inverter, which converts AC-to-DC and DC-to-AC. The inverter also receives DC power generated by non-grid local alternative energy sources, such as wind turbines and photovoltaic solar cells. The local alternative DC power is processed through a voltage regulator in the inverter, which renders the voltage and power uniform enough for use by DC loads. When the local non-grid DC power exceeds the demands of DC loads, it is routed through the inverter to charge a storage battery, which in turn supplies DC power to the DC panel when the non-grid DC power sources are offline.

9 Claims, 4 Drawing Sheets

DC POWER DISTRIBUTION SYSTEM

FIELD OF INVENTION

The present invention relates to the field of DC power distribution systems, and more particularly to low voltage DC power distribution.

BACKGROUND OF THE INVENTION

Typical electrical power systems in residential and commercial buildings distribute alternating current (AC) at line voltage (e.g., 110/220 V) to loads through one or more centralized AC panels. Increasingly, however, households and business electronic devices and lighting are powered by direct current (DC) at low voltage (12/24 V). Cost and efficiency of such DC loads are negatively impacted by the need to provide an AC-to-DC power rectifier, either within the DC device itself or as an external power supply. Moreover, the cost and efficiency of alternative DC power sources, such as solar and wind generators, is compromised by DC-to-AC and AC-to-DC conversions.

The need to efficiently accommodate DC loads demands a centralized low voltage DC power distribution system, which is the principal objective of the present invention.

SUMMARY OF THE INVENTION

The present invention is a DC power system which distributes low voltage (12/24 V) power through a central DC panel to multiple DC loads, such as LED lighting, and to multiple dedicated DC outlets, into which computers, televisions and cell phones can be directly plugged without using an AC-to-DC rectifier. The central DC panel is supplied with DC power (24-36 V) from a central bi-directional inverter, which converts AC-to-DC and DC-to-AC. Examples of such bi-directional inverters are disclosed in U.S. Pat. No. 7,072,194, which is incorporated herein by reference.

The inverter also receives DC power generated by non-grid local alternative energy sources, such as wind turbines and photovoltaic solar cells. The local alternative DC power is processed through a voltage regulator in the inverter, which renders the voltage and power uniform enough for use by DC loads. When the local non-grid DC power exceeds the demands of DC loads, it is routed through the inverter to charge a storage battery, which in turn supplies DC power to the DC panel when the non-grid DC power sources are offline.

If the storage battery is fully charged, the local non-grid DC power is converted to AC by the inverter and transmitted to the AC grid system through the AC panel. If the non-grid local DC power sources are offline and the storage battery is depleted, the DC panel is supplied by the inverter rectifying grid AC from the AC panel to DC power, which is processed by the inverter's voltage regulator before going to the DC panel. When the AC grid is offline, the grid tie-in from the inverter is opened to isolate the DC power distribution system from the AC grid, for the safety of grid line repair workers. In such cases, the DC inverter and panel continue to operate on local and/or battery DC for the duration of the grid outage. The aforesaid functions and frequency of the inverter are controlled by one or more microprocessor circuits.

The DC power panel contains multiple 5-15 amp fuse/breaker blocks, each with an adjustable DC-DC voltage regulator. Each panel block serves one or more DC loads and/or DC outlets. Direct DC loads, such as LED lighting, are supplied with 12V or 24V DC through shielded cable, which insulates from local RF effects. Plug-in DC devices, such as computers, cell phones and televisions, utilize DC outlets that provide both 12V and 24V sockets.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
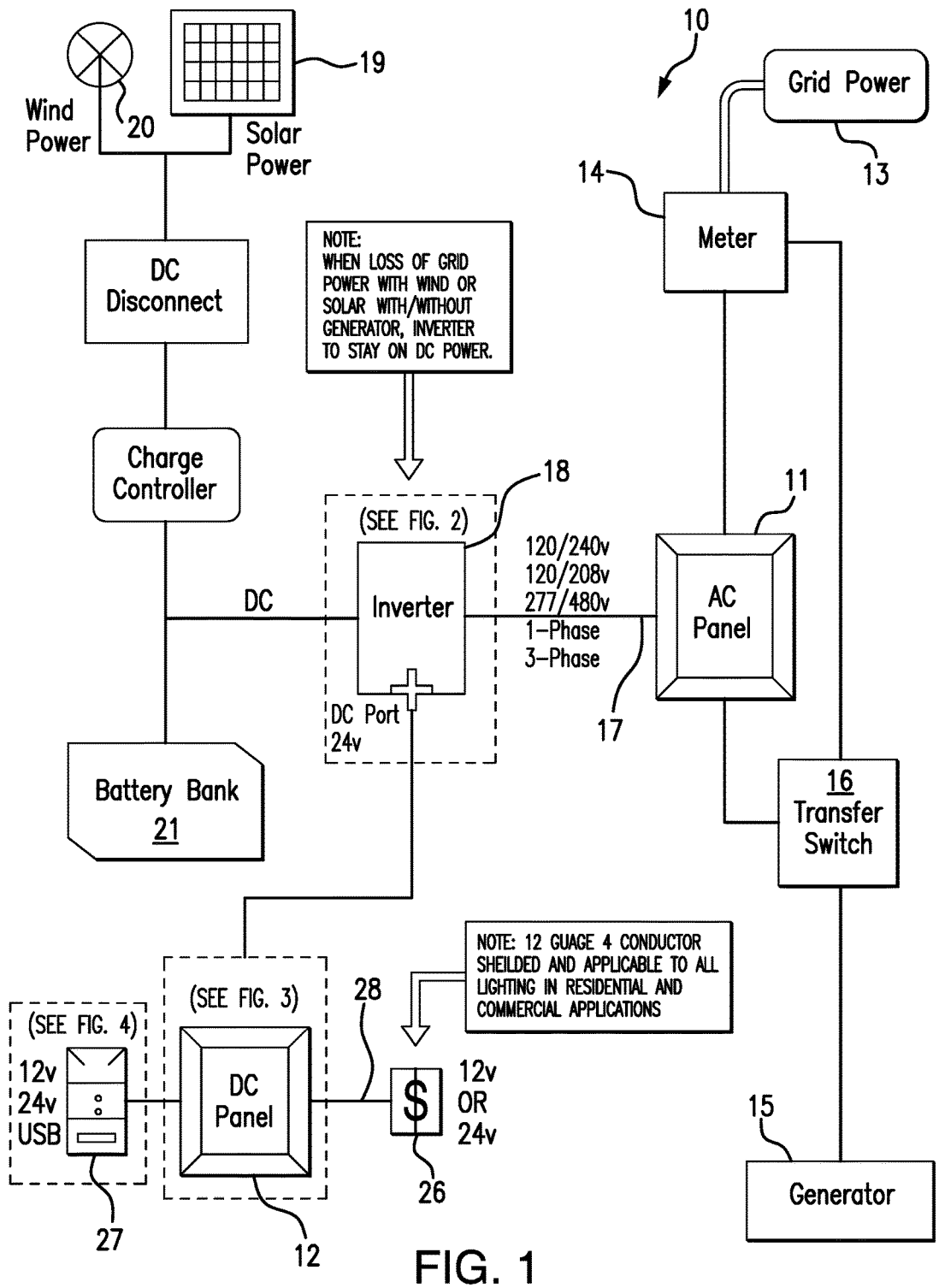
FIG. 1 is a schematic diagram of one embodiment of the present invention.

Referring to FIG. 1, one embodiment of the present invention 10 comprises a central AC panel 11 and a central DC panel 12. The AC panel 11 is connected to an external AC power grid 13 through a meter 14. Optionally, the AC panel 11 can also be connected to an onsite backup AC generator 15 through a transfer switch 16.

Figure 2:
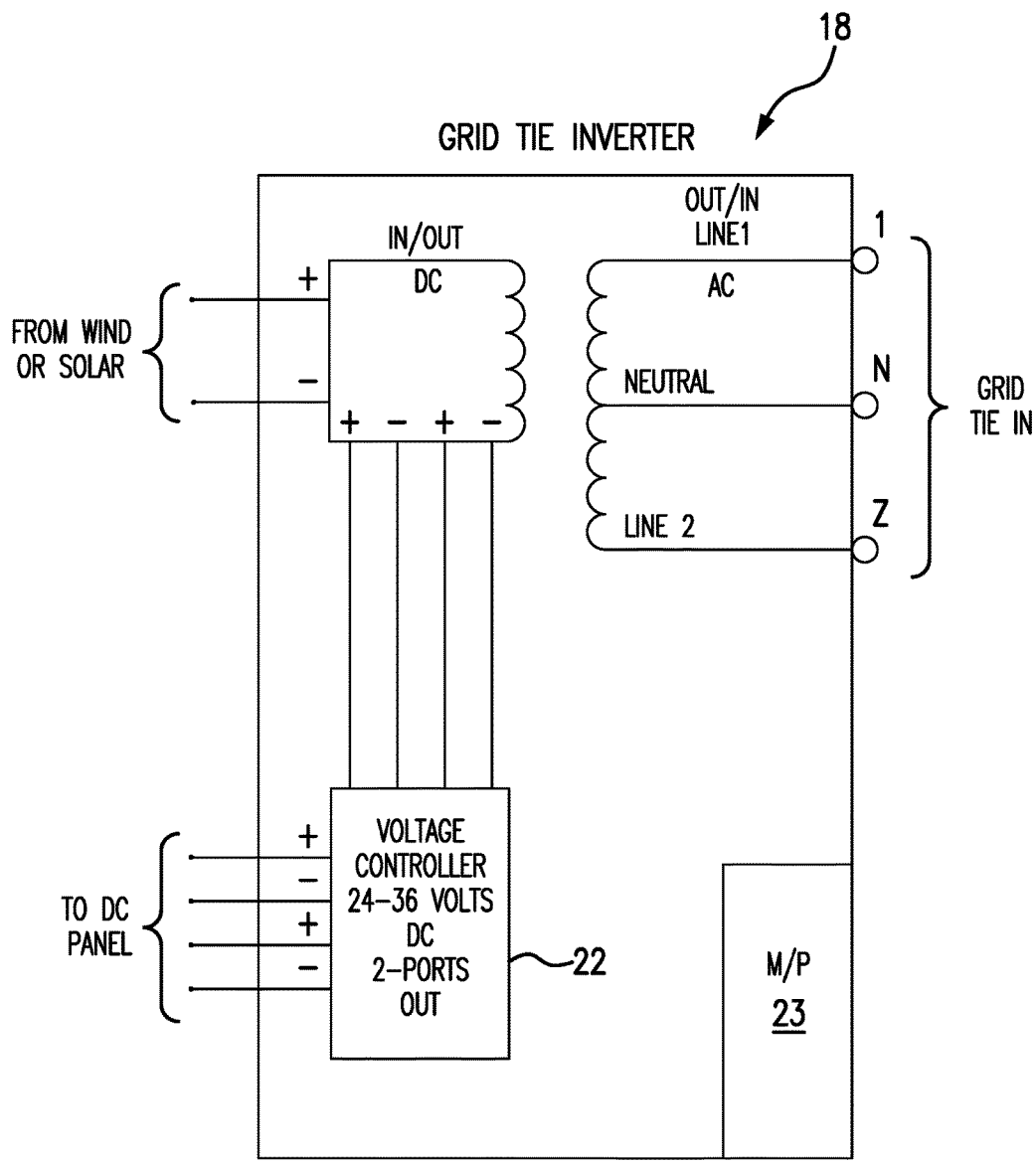
FIG. 2 is a schematic diagram of an exemplary bi-directional inverter for one embodiment of the present invention.

The AC panel 11 is connected through a grid tie-in 17 to a bi-directional inverter 18, shown in FIG. 2. The inverter 18, when operated in the DC-to-AC mode, receives DC power from local solar 19 and/or wind power 20 sources and converts the DC to AC for transmission to the AC panel 11 through the grid tie-in 17. When operated as a rectifier in the AC-to-DC mode, the inverter 18 receives AC power from the AC panel 11 through the grid tie-in 17 and converts the AC to DC for transmission to the DC panel 12 or to a storage battery 21.

When the AC grid 13 is offline, the grid tie-in is opened and the DC panel 12 operates in isolation from the AC panel 11 until the AC grid power 13 is restored. This prevents locally generated solar/wind power 19 20 from being transmitted into the AC grid 13 and creating a shock hazard for utility line repairmen. During AC grid 13 outages, the inverter 18 operates in DC-to-DC mode, taking DC solar/wind power 19 20 and supplying it to the DC panel 12 through a voltage regulator 22. Activation of one of the three inverter modes (DC-to-AC, AC-to-DC or DC-to-DC) is controlled by a microprocessor circuit 23.

Figure 3:
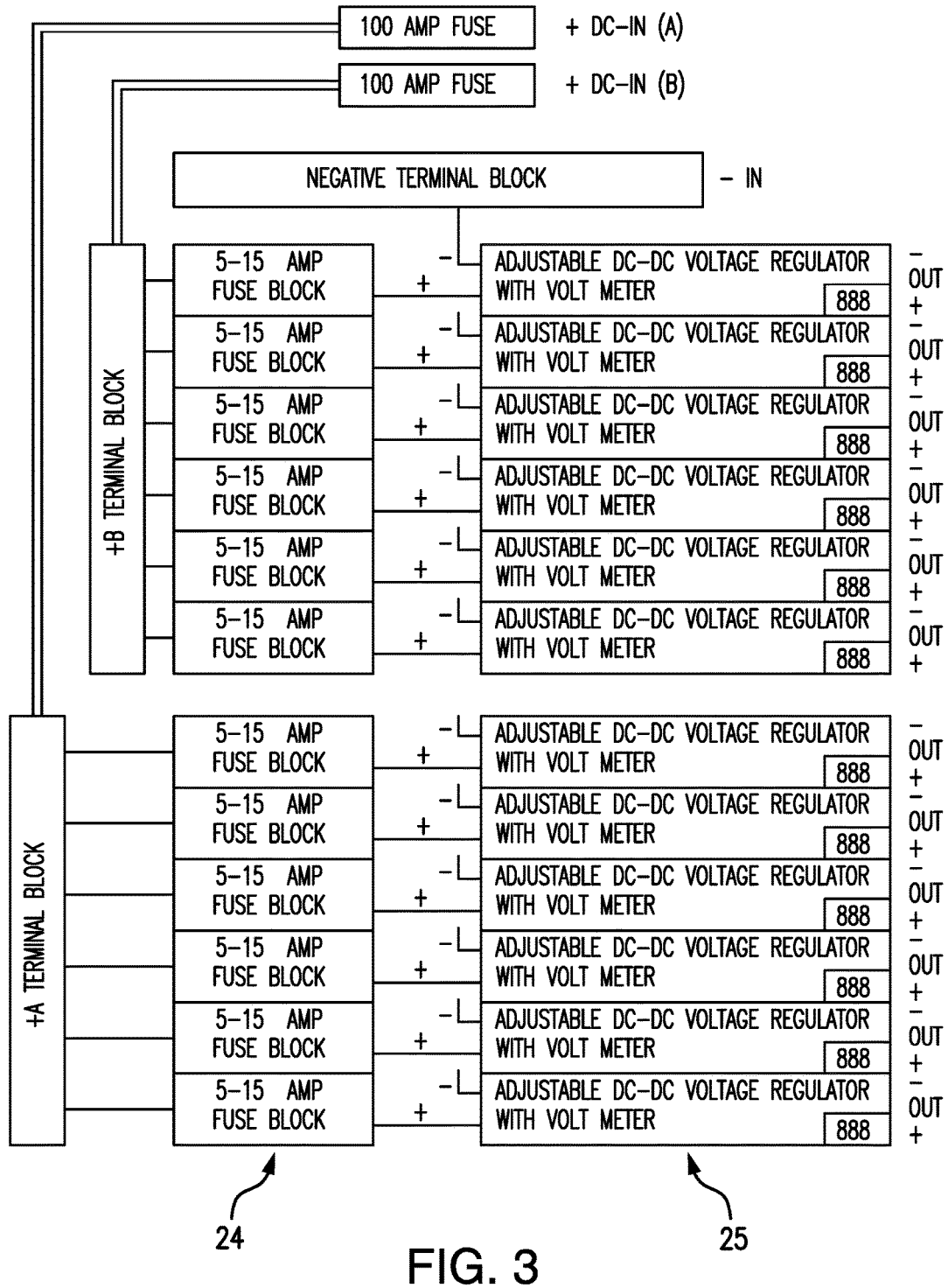
FIG. 3 is a schematic diagram of an exemplary DC panel for one embodiment of the present invention.
Figure 4:
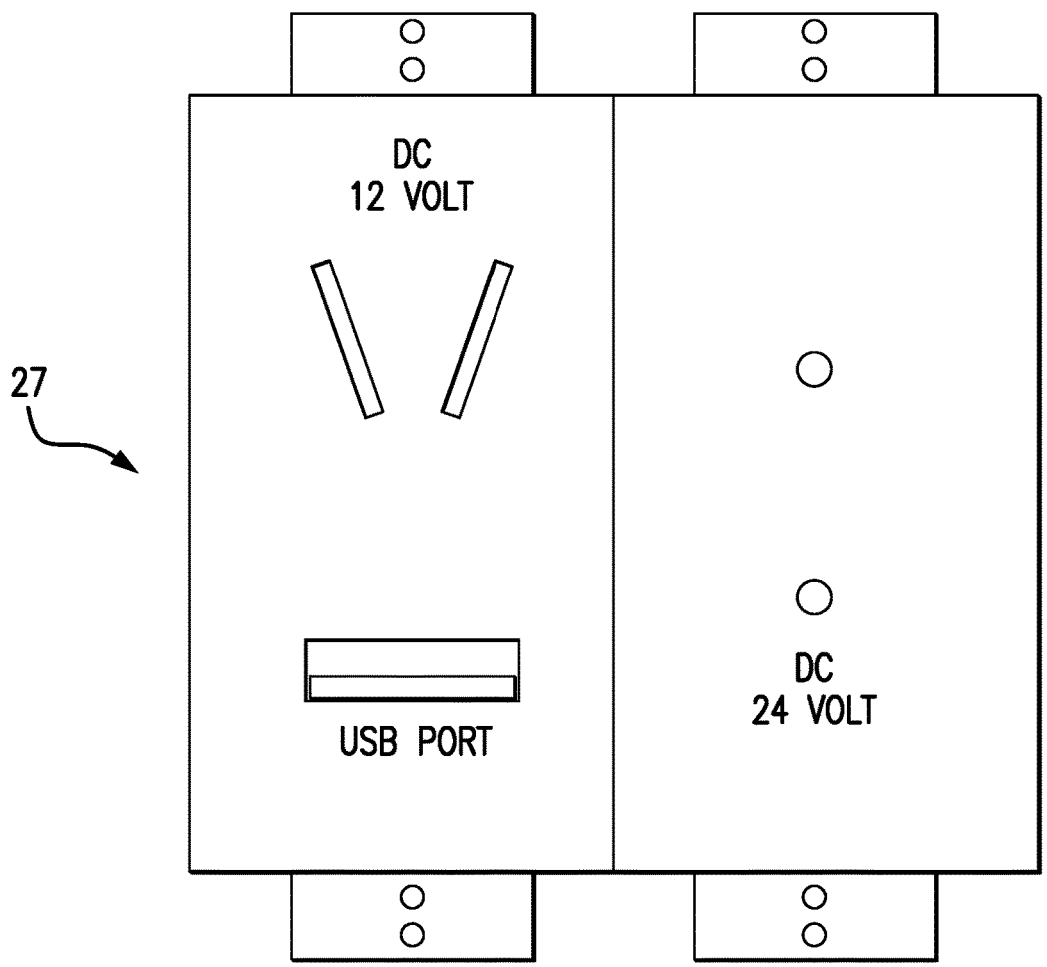
FIG. 4 is a schematic diagram of a DC outlet receptacle for one embodiment of the present invention.

Referring to FIGS. 3 and 4, the exemplary DC panel 12 contains multiple fuse/breaker panel blocks 24, each having an adjustable DC-DC voltage regulator 25. Each panel block 24 serves one or more direct DC loads 26 and/or DC outlets 27. Direct DC loads 26, such as LED lighting, are supplied with 12V or 24V through shielded cable 28. Plug-in DC devices, such as computers, cell phones and televisions, use DC outlets 27 that provide both 12V and 24V sockets, as well as optional USB ports, as shown in FIG. 4.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A DC power distribution system, comprising:
   an AC panel, which receives a grid AC from an AC power grid;
   an inverter, which is separate from the AC panel and is electrically connectable to the AC panel through a grid tie-in, wherein the inverter comprises an inverter circuit, which is configured to convert DC to AC, a rectifier circuit, which is configured to convert AC to DC, and a inverter voltage regulator, which is configured to regulate the voltage and power of DC;
   one or more local DC power sources, which generate a local DC and are electrically connectable either to the inverter circuit or to the inverter voltage regulator;
   a DC panel, which is separate from the AC panel and from the inverter and is electrically connected to the inverter voltage regulator, wherein the DC panel comprises multiple fuse/breaker blocks, each of which has a block voltage regulator;
   one or more direct DC loads, each of which is electrically connected to one of the block voltage regulators;
   one or more indirect DC loads, comprising one or more DC outlets, each of which is electrically connected to one of the block voltage regulators, wherein each of the DC outlets is configured with one or more DC sockets, which are adapted to connect to one or more plug-in DC devices;
   wherein, when the local DC power sources are connected to the inverter voltage regulator, the inverter voltage regulator converts the local DC to a regulated local DC, which the inverter voltage regulator transmits to the DC panel, or when the regulated local DC exceeds a sum of the direct DC loads and the indirect DC loads by a local DC increment, the inverter voltage regulator transmits the local DC increment to one or more storage batteries, in which the local DC increment is stored as a battery DC power;
   wherein, when the local DC power sources are connected to the inverter circuit, the inverter circuit converts the local DC into a local AC, which the inverter circuit transmits to the AC panel through the grid tie-in; and
   wherein, when the local DC power sources are disconnected from both the inverter voltage regulator and from the rectifier, the rectifier circuit is connected to the AC panel through the grid tie-in, and the rectifier circuit converts the grid AC to a grid DC and transmits the grid DC to the inverter voltage regulator, which transmits a regulated grid DC to the DC panel.

2. The DC power distribution system of claim 1, wherein, when the AC power grid is offline, the grid tie-in is opened so as to isolate the inverter from the AC panel, and the inverter voltage regulator transmits to the DC panel either the regulated local DC or the battery DC power.

3. The DC power distribution system of claim 2, wherein the inverter circuit and the rectifier circuit are combined in a bi-directional inverter.

4. The DC power distribution system of claim 3, wherein the inverter further comprises a microprocessor, which controls the grid tie-in and connections to the inverter circuit, the rectifier circuit and the inverter voltage regulator.

5. The DC power distribution of claim 4, wherein one or more of the DC outlets have a 12-volt socket and a 24-volt socket.

6. The DC power distribution of claim 3, wherein one or more of the DC outlets have a 12-volt socket and a 24-volt socket.

7. The DC power distribution system of claim 2, wherein the inverter further comprises a microprocessor, which controls the grid tie-in and connections to the inverter circuit, the rectifier circuit and the inverter voltage regulator.

8. The DC power distribution of claim 7, wherein one or more of the DC outlets have a 12-volt socket and a 24-volt socket.

9. The DC power distribution of claim 2, wherein one or more of the DC outlets have a 12-volt socket and a 24-volt socket.

* * * * *